United States Patent Office 3,239,173
Patented Mar. 8, 1966

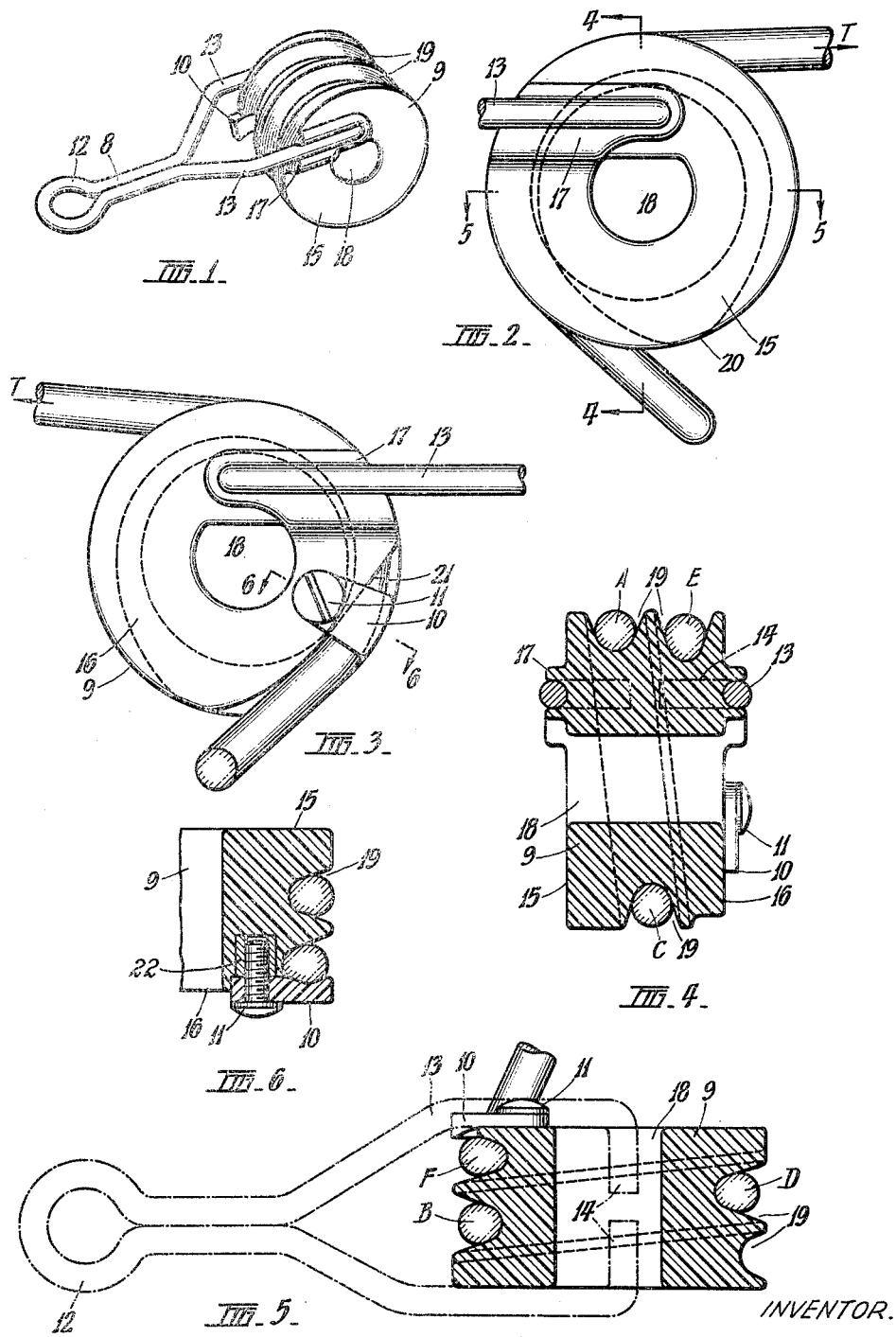

3,239,173
CABLE ANCHORAGE DEVICES
Philip Laurence Watkins, 8 McDonald St., Glen Iris,
Victoria, Australia
Filed June 5, 1964, Ser. No. 372,957
11 Claims. (Cl. 248—63)

This invention relates to cable anchorage devices and it refers in particular, but not exclusively, to an anchorage for home-supply electric cable which can be readily attached to a pole or to a house.

One method of fastening electricity supply cable to a pole or to a house is to fasten an insulator member to the pole or house, then to wind the cable one half turn about that insulator member so that the cable extends back on itself, and to clamp the two branches of the cable together by a suitable clamp or clip. The free end of the cable is then connected to a junction box. However, with braided cable—cable wire covered with insulation and then covered with a braided fabric such as cotton— such clamps or clips as have been used grip the outer covering but there is such a tensile load on the cable that the outer covering and, sometimes, the insulation is stripped off the cable wire.

In order to overcome that defect it has been proposed to provide a cable anchorage device consisting of a bracket for attachment to a pole, house or other supporting structure, a drum of substantially cylindrical shape mounted within the bracket and made of insulating material, and a separate two-piece cable clamp attachable to the bracket. This device is used by fastening the bracket to the supporting structure, then wrapping the electricity supply cable at least one full turn— and preferably two full turns—around the drum—and then clamping the free end portion of the cable in the cable clamp, the free end being thus connected to a conveniently-located junction box. The tensile loading on the cable is taken up by the frictional grip of the cable on the drum and by the clamping pressure applied to the cable by the clamp.

However, these anchorage devices were not entirely satisfactory. If the cable is wrapped once only around the drum only a small part of the tensile load on the cable is counterbalanced by the frictional grip of the cable on the drum end, therefore, the clamp has to be tightened to such an extent that there is a likelihood of damage to the covering of the cable wire. Also, in order to secure the clamp cover in position it is necessary to first fit the cover in position and then to tighten the screws holding it—and at the same time the linesman has to maintain sufficient tension on the cable to hold it in position and prevent it unwinding from the drum. If, on the other hand, the cable is wrapped twice around the drum there is involved the work of so wrapping it around the drum, and the cable still has to be held with some tension on it when the cable clamp is being fitted and tightened. There is also the factor of the cost of the length of cable required to wrap the second time around the drum. If the drum is, say, three inches in diameter an additional length of 10″ of cable is required at each end. Thus, for installing one house electricity supply cable an additional length of 20″ is required due to the second turn around the drum at each end. This cable is relatively expensive and as many thousands of these installations are done each year the total additional cost of the cable due to that second turn around the drum at each end can be very high indeed.

It is an object of this invention to provide an anchorage device which will effectively hold the supply cable against slipping and which will not deform the cable in any adverse manner or bite into the cable to any material extent. A further object is to provide an anchorage device which will be easy to operate in that a cable may be readily fitted to it and clamped in position, and wherein a minimum of adjustment will be required by an operator. Another object is to provide an anchorage device which will effectively hold a cable with a relatively small number of turns about a drum or reel—as about one and one-third turns—so as to provide for a reduction in the length of cable required to permit it to be correctly anchored.

In accordance with the present invention there is provided an anchorage device including a reel or drum member having a peripheral groove adapted to grip a cable and restrain it from slipping upon application of a pull on the cable in the direction of the cable extending away from the drum. It is preferred that the drum be substantially cylindrical in shape, having a substantially helical groove for gripping the cable. It is also preferred that at least one of the factors comprising width of the groove, depth of the groove and wall angle of the groove vary from the start of the groove to the end thereof so as to provide for a gradually increasing frictional grip on the cable from the position whereat the cable first contacts the drum to about the position whereat the cable is held in position or clamped on the drum. It is also preferred that there be incorporated, in the reel or drum, a clamp for the free end portion of the cable so as to hold the cable against unwinding from the drum.

In order that the invention may be clearly understood and readily put into practical form a preferred construction of cable anchorage device made according to the invention will now be described with reference to the accompanying illustrative drawings, wherein:

FIG. 1 is a perspective view of the device;

FIG. 2 shows a view of the drum or reel of the device, from one side, with a cable wound on it;

FIG. 3 is a view of the drum or reel from the other side:

FIG. 4 shows a vertical cross-section on the line and in the direction of the arrows 4—4 of FIG. 2;

FIG. 5 shows a horizontal cross-section on the line and in the direction of the arrows 5—5 of FIG. 2, the bracket for fastening the drum or reel being shown in chain-dotted line; and FIG. 6 is a substantially radial cross-section through the drum or reel on the line and in the direction of the arrows 6—6 of FIG. 3, illustrating the shape of the cable clamp.

The cable anchorage device made according to this invention and as illustrated in the drawings consists of a bracket 8 by means of which the device may be attached to a support—as an attachment bracket on a barge board of a house—and a drum 9 having a clamp 10 attached thereto by a screw 11.

The bracket 8 has an eye 12 for the reception of a hook of an attachment, and two side arms 13 which extend on opposite sides of the drum 9 and terminate with in-turned fingers 14 engaging in a transverse hole through the drum 9. The bracket may be made of heavy gauge wire, with the side arms welded together forwardly of the eye 12, and galvanised to restrain attack by weather.

The drum 9 has two side walls 15 and 16 both of which are embossed at 17 to support the forward ends of the bracket arms 13, an axial hole 18 and a circumferential, substantially helical, groove 19 which extends nearly two complete turns around the drum. That groove is of a particular design or construction in that it gradually increases in depth from the start of the groove, at the point indicated by the reference 20, to the location of the clamp 10. Thus, there is a relationship between the depth of the groove 19 and the circumferential distance around the drum 9 from the point 20. The width of the groove at its outer part—that is to say, the part at the greater radius from the centre of the drum—is uniform throughout its length and the inclination of the side walls of the groove is also uniform, being the same as the inclination of the walls of grooves of a standard rope-drive pulley. The width of the groove depends upon the external diameter of the cable with which the device is to be used, and the greatest depth of the groove is such that a cable tightly wound therein will be securely gripped by the side walls, whereas at the point where the cable enters the groove there is only a nominal frictional grip of the cable by the side walls. This can be seen from the views of the cable in FIGS. 4, 5 and 6. The section of the cable indicated by the reference A in FIG. 4 is at, or at about, the point of entry and it seats in the bottom of the groove without any substantial distortion of the cable. One quarter turn further around the drum the section of cable indicated by the reference B in FIG. 5 is distorted slightly, the section denoted C in FIG. 4 is distorted somewhat more, the section denoted D in FIG. 5 is still further distorted, and the section indicated by the reference F in FIG. 5 is very much distorted.

Thus, it can be seen that the frictional grip of the cable by the walls of the groove 19—which is additional to that applied by the bottom of the groove—increases from the point of entry of the cable into the groove up to a location just before the position of the clamp 10. It is believed that by correct design of the groove the frictional grip upon the cable may be increased, from the point of entry of the cable into the groove up to the point at which the cable is gripped by the clamp 10, gradually in such a manner that the tension loading upon the cable is gradually and progressively reduced so that at the clamp location the tensile loading is nil.

The side 16 of the drum 9 is cut away at 21 and radially inwardly of that cut-away part an internally screw-threaded insert 22 is set into the side of the drum. The clamp screw 11 is engaged in that insert 22 and the clamp 10 extends substantially radially therefrom, extending over the cut-away portion 21 so as to be adapted to engaged with the cable in the groove at that location. Thus, at that part, the clamp 10 constitutes a second side of the groove 19, but it is shaped to apply a holding pressure on the cable and to prevent the cable unwinding from the drum—that is to say, it holds in place the free end portion of the cable which extends to a junction box—as at the entrance of the cable into a house.

The combined effect of the frictional grip applied to the cable by the walls and bottom of the groove and the clamping pressure of the clamp 10 is sufficient to hold the cable against slipping for all reasonable tensions which may be applied to the cable in use.

It is to be noted that if the cable be wound loosely in the groove 19 it will merely rest upon the side walls of the groove, but as tension is applied to the cable in the direction of the arrow T in FIG. 2 or FIG. 3 the cable will be pulled down into the groove, thereby increasing the frictional grip on the cable. At the location of the clamp 10 there will be relatively little tensile loading on the cable, so that the clamp does not do a great deal more than to hold the cable in position and prevent it unwinding.

It is preferred that the drum 9 and clamp 10 be made of fibre-bonded by phenolformaldehyde—such as that known by the registered trademark "Bakelite"—or of synthetic resinous, or plastic, material which will withstand weather and have a relatively long life, as well as being durable in use and possessing suitable electrical-insulation properties.

It will be appreciated that instead of the depth of the groove being varied from one end to the other the wall inclination may be increased to provide the same effect— namely, a gradually-increasing frictional grip of the cable within the groove. Also, both factors may be employed— that is to say, a gradually-increasing depth of groove and a gradually increasing inclination of the walls to the tangential plane, that is to say, the two walls gradully approaching the parallel condition.

The cable to be held by the anchorage device is pulled taut so that an appropriate tension is applied to the cable. The end part of the cable is then placed in the groove of the drum 9 and is passed around the drum approximately one and a quarter times. The linesman then holds the cable just past the location of the clamp 10, engages the cable between the clamp and the wall of the groove, tightens the screw 11 so that the cable is clamped in position, and the free end of the cable is connected to a junction box.

This pulls the cable tightly into the groove 19 about the drum 9, and it is found that the cable passing round the drum is gripped sufficient tightly that it is, virtually, gripped by the drum 9 and does not tend to pull loose. Thus an operator can readily, and easily, fit a cable to the anchorage device made according to the invention without having to adjust or tighten any part of the anchorage device, other than the fitting of the clamp 10.

The drum may be made to take any one of a range of diameters of cable by providing a groove which is deep enough at about the location of the cable section F—see FIG. 5—to provide a secure grip upon the smallest diameter cable of the range, and shallow enough at about the location of the cable section A—see FIG. 4—to accommodate the largest diameter cable of the range.

What I claim is:

1. A cable anchorage device comprising a drum member having a peripheral groove in the circumference thereof, at least one dimension of said groove varying gradually from the input end of said groove to a location near the other end thereof to provide for a gradually increasing frictional grip upon a cable positioned in said groove to restrain such cable from slipping upon application of a pull thereon in the direction extending away from said drum.

2. A cable anchorage device according to claim 1 wherein the drum member is of substantially cylindrical shape with the groove in its circumference, and that the groove is of substantially helical form.

3. A cable anchorage device comprising a drum member having a peripheral groove adapted to grip a cable and restrain it from slipping upon application of a pull on the cable in the direction extending away from said drum, said drum member being of substantially cylindrical shape with said groove in its circumference, said groove being of substantially helical form and having a cross-sectional shape with tapered side walls, and the depth of said groove gradually increasing from the input end of the groove to a location near the other end thereof.

4. A cable anchorage device according to claim 1 wherein a clamp is fitted to one side of the drum adjacent to the outlet end of the groove, said clamp being adapted to apply a clamping pressure to one end portion of the cable.

5. A cable anchorage device according to claim 4 wherein the side of the drum is cut away at the location of the clamp and said clamp constitutes one side wall of the groove at that location.

6. A cable anchorage device including a drum member, means for fastening said drum member to a support, a peripheral groove in the outer circumferential surface of the drum member, said groove extending for at least one complete turn and being arranged substantially helically with an input end and an outlet end, said groove being of a cross-sectional shape having tapered side walls and an arcuate base, and the groove being shaped so that the width of the bottom part of the groove decreases progressively from the input end to the outlet end of the groove so as to be adapted to provide a progressively increasing grip upon a cable located within the groove.

7. A cable anchorage device according to claim 6 wherein a clamp member is fitted to the drum member adjacent to the outlet end of the groove so as to be adapted to apply a gripping pressure upon a cable located within the groove.

8. A cable anchorage device including a drum member, a mounting bracket attached to the drum and adapted to hold the drum against rotation, a substantially helical groove in the outer circumferential surface of the drum and having an input and an outlet end, said groove having a cross-sectional shape which is varied progressively from the input end to the outlet end so as to be adapted to provide a progressively increasing frictional grip upon a cable located within the groove, and clamping means attached to one side of the drum adjacent to the outlet end of the groove.

9. A cable anchorage device according to claim 8 wherein the groove in cross-section is of somewhat V shape having an arcuate bottom part and the depth of the groove is increased progressively from the input end to the outlet end and the radius of curvature of the arcuate bottom part simultaneously decreased progressively.

10. A cable anchorage device according to claim 8 wherein the groove in cross-section is of somewhat V shape having an arcuate bottom part and the inclination of the side walls of the groove is progressively increased so that the side walls progressively approach the parallel from the input end to the outlet end of the groove.

11. A cable anchorage device comprising a drum member having a peripheral groove in the circumference thereof adapted to grip a cable and restrain it from slipping upon application of a pull thereon in the direction extending away from said drum, and the depth of said groove gradually increasing from the input end thereof to a location near the other end thereof.

References Cited by the Examiner
UNITED STATES PATENTS

| | | | |
|---|---|---|---|
| 593,689 | 11/1897 | Rembe | 174—175 X |
| 804,115 | 11/1905 | Goodridge | 174—174 X |
| 2,139,415 | 12/1938 | McLachlan | 248—63 |
| 2,424,760 | 7/1947 | Konkle | 24—135 |
| 2,471,305 | 5/1949 | Card | 24—135 |
| 2,709,844 | 6/1955 | Channell | 24—129 |

CLAUDE A. LE ROY, *Primary Examiner.*